United States Patent
Lotspiech et al.

(10) Patent No.: US 7,523,307 B2
(45) Date of Patent: *Apr. 21, 2009

(54) METHOD FOR ENSURING CONTENT PROTECTION AND SUBSCRIPTION COMPLIANCE

(75) Inventors: Jeffrey Bruce Lotspiech, San Jose, CA (US); Dalit Naor, Palo Alto, CA (US); Sigfredo Ismael Nin, Morgan Hill, CA (US); Florian Pestoni, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1758 days.

This patent is subject to a terminal disclaimer.

(21) Appl. No.: 10/042,652

(22) Filed: Jan. 8, 2002

(65) Prior Publication Data

US 2002/0104001 A1    Aug. 1, 2002

Related U.S. Application Data

(63) Continuation-in-part of application No. 09/770,877, filed on Jan. 26, 2001.

(51) Int. Cl.
 *H04L 9/00* (2006.01)
 *H04L 9/32* (2006.01)
 *G06F 12/14* (2006.01)
(52) U.S. Cl. .......... 713/163; 713/193; 380/277
(58) Field of Classification Search ........... 713/158, 713/163
 See application file for complete search history.

(56) References Cited

U.S. PATENT DOCUMENTS

| | | | | |
|---|---|---|---|---|
| 6,098,056 A | 8/2000 | Rusnak et al. | ................ | 705/75 |
| 6,138,119 A | 10/2000 | Hall et al. | ...................... | 707/9 |
| 6,263,435 B1 | 7/2001 | Dondeti et al. | ............... | 713/163 |
| 6,397,329 B1* | 5/2002 | Aiello et al. | ................. | 713/155 |
| 6,684,331 B1* | 1/2004 | Srivastava | ................... | 713/163 |
| 6,690,795 B1* | 2/2004 | Richards | ...................... | 380/203 |
| 6,691,149 B1* | 2/2004 | Yokota et al. | ............... | 709/201 |
| 6,839,436 B1* | 1/2005 | Garay et al. | ................ | 380/278 |
| 7,039,803 B2* | 5/2006 | Lotspiech et al. | ........... | 713/163 |
| 2001/0029581 A1* | 10/2001 | Knauft | ....................... | 713/193 |

(Continued)

OTHER PUBLICATIONS

Bruce Schneier, Applied Cyrtography, 1996, John Wiley & Sons, 2nd ed., p. 270.*
Publication: "Dynamic Traitor Tracing". Fiat et al. International Cryptology Conference, 19th, Santa Barbara. Proceedings of CRYPTO '99, Advances in Cryptology, LNCS, vol. 1666, pp. 354-371. Aug. 1999.
Publication: "Privilege Transfer and Revocation in a Port-Based System". Ramamritham et al. IEEE Transactions on Software Engineering. vol. 12, Issue 5, pp. 635-648, May 1986.

(Continued)

*Primary Examiner*—Kambiz Zand
*Assistant Examiner*—Aubrey H Wyszynski
(74) *Attorney, Agent, or Firm*—John L. Rogitz

(57) ABSTRACT

A method for enforcing compliance in both the copy protect domain and service subscription domain for streamed multicast data. Each content is encrypted with a title key that itself is encrypted with a channel unique key which is a hash of a session key and a channel key. A compliant player is given the channel key upon registration for a subscription service (representing subscription protection) and is also given device keys upon activation (representing copy protection) for decrypting the session key. Consequently, the channel unique key can be obtained (and, hence, the content decrypted) only by a player that is compliant with both copy protection rules and subscription rules. The channel key can be refreshed periodically as subscriptions change or expire.

13 Claims, 3 Drawing Sheets

U.S. PATENT DOCUMENTS

| | | | |
|---|---|---|---|
| 2002/0083319 A1* | 6/2002 | Ishiguro et al. | 713/168 |
| 2002/0174366 A1* | 11/2002 | Peterka et al. | 713/201 |
| 2003/0051151 A1* | 3/2003 | Asano et al. | 713/193 |
| 2005/0131832 A1* | 6/2005 | Fransdonk | 705/59 |
| 2005/0198679 A1* | 9/2005 | Baran et al. | 725/88 |

OTHER PUBLICATIONS

Publication: "Secure Group Communications Using Key Graphs". Wong et al. Proceedings of ACM SIGCOMM, pp. 1-12. Sep. 1998. Canada.

Publication: "Efficient Communication-Storage Tradeoffs for Multicast Encryption". Canetti et al. EUROCRYPT 1999. pp. 459-474.

Publication: "Key Establishment in Large Dynamic Groups Using One-Way Function Trees". McGrew et al. Submitted to IEEE Transactions on Software Engineering. pp. 1-13. May 1999.

Publication: "Multicast Security: A Taxonomy and Some Efficient Constructions". Canetti et al. Proc. of INFOCOM. vol. 2, pp. 708-716. New York, Mar. 1999.

Publication: "Broadcast Encryption". CRYPTO 1992, LNCS vol. 839, pp. 257-270, New York, Mar. 1994.

* cited by examiner

ENCRYPTION

METHOD FOR ENSURING CONTENT PROTECTION AND SUBSCRIPTION COMPLIANCE

RELATED APPLICATIONS

This is a continuation-in-part of U.S. patent application Ser. No. 09/770,877, filed Jan. 26, 2001, incorporated herein by reference.

BACKGROUND OF THE INVENTION

1. Field of the Invention

The present invention relates generally to multicast data encryption.

2. Description of the Related Art

Protecting copyrights of content owners and subscription rights of providers of the content poses considerable challenges in the digital age, particularly to content that is "streamed" to users over the Internet. In contrast to more conventional content download, in streaming paradigms the data that is being transmitted can be used by the recipient before the end of the file has been received. For time-dependent content such as music or videos, streaming requires mechanisms to ensure that data is available when needed.

"Streaming" is one common application of multicasting. In multicasting, multiple users can receive the same stream roughly simultaneously. Multicasting thus combines characteristics of broadcasting and point-to-point communications, since a copy of the data is sent to all recipients.

The rights of two separate entities are implicated in content streaming. First, the content owner typically desires that the content not be copied, i.e., that the content not be copied unless explicitly authorized. This requirement remains fixed over time. Second, the provider of the service that streams the content to users wants to ensure that only authorized users receive the stream, typically pursuant to a paid-for subscription or pay-per-view service, and that unauthorized users cannot access the content absent a subscription regardless of whether they are using copyright-compliant players. The latter requirement changes over time, since subscriptions typically are time-based and usually expire after a subscription period. The present invention thus recognizes the need for multiple enforcement domains, i.e., for a subscription enforcement domain overlaid on a copyright protection domain.

The present invention further recognizes that certain broadcast encryption schemes can be used in the streaming data application described above to achieve both copyright protection and subscription enforcement. Two such schemes are summarized here.

U.S. Pat. No. 6,118,873, incorporated herein by reference, discloses a system for encrypting broadcast music, videos, and other content. As set forth therein, only authorized players, implemented either by hardware or software, can play and/or copy the content and only in accordance with rules established by the vendor of the content.

In the encryption method disclosed in the above-referenced patent, authorized players are issued software-implemented device keys from a matrix of device keys. The keys can be issued simultaneously with each other or over time, but in any event, no player is supposed to have more than one device key per column of the matrix. Although two players might share the same key from the same column, the chances that any two players share exactly the same set of keys from all the columns of the matrix are very small when keys are randomly assigned. The keys are used to decrypt content.

In the event that a player (and its keys) becomes compromised, deliberately or by mistake, it is necessary to revoke the keys of that player. Revoking a set of keys effectively renders the compromised player (and any clones thereof) inoperable to play content that is produced after the revocation.

Another broadcast encryption method is disclosed in the above-referenced parent application, in which players are grouped into (possibly overlapping) subsets, with each subset having a unique, long-lived subset key. Each player is assigned respective private information $I_u$. A short-lived session encryption key K is selected, and players that are not in a revoked set R are partitioned into disjoint subsets $S_{i1}, \ldots S_{im}$ having associated subset keys $L_{i1}, \ldots, L_{im}$. The session key K is encrypted with the subset keys $L_{i1}, \ldots, L_{im}$ to render m encrypted versions of the session key K. The players establish leaves in a tree such as a complete binary tree, and the subsets $S_{i1}, \ldots S_{im}$ are induced by the tree.

With more specificity, in the parent application the players are initially partitioned into groups $S_1, \ldots, S_w$, wherein "w" is an integer. A given transmission selects m such groups as a "cover" for non-revoked players, with the cover being defined by the set of revoked players. The "cover" groups establish subtrees (either complete subtrees or a difference between two subtrees) in a tree. A player's private information $I_u$ is preferably found as information $i_j$ in a transmitted message that indicates that a player belongs to a subset $S_{ij}$ of one of the groups $S_1, \ldots, S_w$. In one embodiment, the information $I_u$ consists of a player's position in the tree and the subset keys that are associated with ancestor nodes of the player. A subset key $L_{ij}$ can then be obtained from or derived using the private information of the player.

In one embodiment referred to as the "complete subtree" method, respective groups correspond to all possible subtrees in the complete tree. Each player is assigned keys from all nodes that are in a direct path between a leaf representing the player and the root of the tree. In other words, each subset $S_1$ includes all leaves in a subtree rooted at some node $v_1$, with at least each node in the subtree being associated with a respective subset key. In this embodiment, content is provided to players in a message defining a header, and the header includes at most r*log(N/r) subset keys and encryptions, wherein r is the number of players in the revoked set R and N is the total number of players. Moreover, each player must store log N keys, and each player processes the message using at most log N operations plus a single decryption operation.

In a second embodiment referred to as the "subset difference" method, respective groups of players correspond to a universe of sets $S_1, \ldots, S_w$ that can be described as "a first subtree A minus a second subtree B that is entirely contained in A". Each node in this tree has a set of labels, one unique to the node and others that are induced by ancestor nodes. Each player is assigned labels from all nodes hanging from nodes in a direct path between the receiver and the root (at most logN labels from each such node), but not from nodes in the direct path itself. In other words, each subset includes all leaves in a subtree rooted at some node $v_i$ that are not in the subtree rooted at some other node $v_j$ that descends from $v_i$. One of the labels of the subset difference nodes for a particular player are provided to the player in a transmission as that player's private information. Using the labels, the player can generate the subset keys necessary for decryption.

With respect to the subset difference method of the parent application, the revoked set R defines a spanning tree. A cover tree T is initialized as the spanning tree, and then the method iteratively removes nodes from the cover tree T and adds subtrees to the cover tree T until the cover tree T has at most one node. The cover tree T is used to identify subset keys to be used in a particular transmission, with players evaluating the pseudorandom sequence generator to derive subset keys from the labels. Preferably, for processing efficiency revocations are processed in order from left to right such that only two revocations at a time must be kept in memory.

Other less preferred encryption systems have been provided. Examples of such systems include the tree-based logical key hierarchy systems disclosed in Wallner et al., *Key Management for Multicast: Issues and Architectures*, IETF draft wallner-key, 1997, and Wong et al., *Secure Group Communication Using Key Graphs*, SIGCOMM 1998. With more specificity regarding the methods of Wallner et al. and Wong et al., keys are assigned by assigning an independent label to each node in a binary tree. Unfortunately, in the referenced methods some of the labels change at every revocation, and consequently are inappropriate for certain scenarios such as the stateless player scenario and moreover would require excessive encryptions and decryptions.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method for multicasting data includes encrypting a title T with a title key $K_T$, and encrypting the title key $K_T$ with a channel-unique key $K_{cu}$ using an encryption function S to render a multicast data channel encrypted as $S_{Kcu}(K_T)$, $S_{KT}$ (T).

In a preferred embodiment, the channel-unique key $K_{cu}$ is the result of a combination such as a hash of a channel key $K_c$ and a session key $K_s$. Moreover, the session key $K_s$ preferably is encrypted with a first encryption scheme $B^R_{s1}$ to render a session key block.

In the preferred embodiment, a player is provided with device keys $K_d$ during or pursuant to activation of the player. Also, the player is provided with the channel key $K_c$ and a session key block during or pursuant to registration of the player with a subscription service. These provisions can be made point-to-point or as part of a broadcast. In any case, the player can determine the session key $K_s$ from the session key block using the device keys $K_d$.

If desired, the method can include periodically refreshing the channel key $K_c$ to enforce subscriptions, and selectively updating the session key block to revoke compromised players. The channel key $K_c$ can be refreshed by encrypting a new channel key $K_c'$ with an encryption scheme. For bandwidth considerations, the channel key $K_c'$ can be sent in a message that is split, and it also can be refreshed using plural messages.

In a particularly preferred embodiment, at least the encryption scheme $B^R_{s2}$ includes assigning each player in a group of players respective private information $I_u$, and partitioning players not in a revoked set R into disjoint subsets $S_{i1}, \ldots S_{im}$ having associated subset keys $L_{i1}, \ldots L_{im}$. The scheme further includes encrypting the session key $K_S$ with the subset keys $L_{i1}, \ldots, L_{im}$ to render m encrypted versions of the session key $K_S$. If desired, the encryption scheme $B^R_{s2}$ may further include partitioning the players into groups $S_1, \ldots, S_w$, wherein "w" is an integer, and the groups establish subtrees in a tree. The tree includes a root and plural nodes, with each node having an associated label. Each subset can include all leaves in a subtree rooted at some node vi that are not in the subtree rooted at some other node $v_j$ that descends from $v_i$. The revoked set R can define a spanning tree, and the encryption scheme can further entail initializing a cover tree T as the spanning tree, and iteratively removing nodes from the cover tree T and adding nodes to a cover until the cover tree T has at most one node. Or, each node can have a label possibly induced by at least one of its ancestors, and each player can be assigned labels from all nodes hanging from a direct path between the player and the root but not from nodes in the direct path. Labels can be assigned to subsets using a pseudorandom sequence generator.

In another aspect, a method for enforcing copy protection compliance and subscription compliance includes providing players with respective device keys $K_d$ that are useful for enabling copy protection compliance. The method also includes providing players with at least one channel key $K_c$ that is useful for enabling subscription compliance, such that a player can decrypt content only if the player is both compliant with copy protection and the player is an active subscriber to a content channel.

In still another aspect, a player for decrypting streamed content includes at least one device key $K_d$ and means for decrypting a session key $K_s$ using the device key $K_d$. The player also includes means for decrypting a channel unique key $K_{cu}$ using at least the session key $K_s$. Moreover, the player can include means for deriving a title key $K_T$ using at least the channel unique key $K_{cu}$, with the title key $K_T$ being useful for decrypting content.

In yet another aspect, a computer program device has a computer program storage device which includes a program of instructions that are usable by a computer. The device includes logic means for receiving private information $I_u$ upon registration with a content provider. Also, the device has logic means for subscribing to at least one content channel provided by the content provider, and logic means for receiving at least one channel key $K_c$ in response to subscribing to the channel. Logic means are provided for using at least the channel key $K_c$ and private information $I_u$ to decrypt content streamed over the channel.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
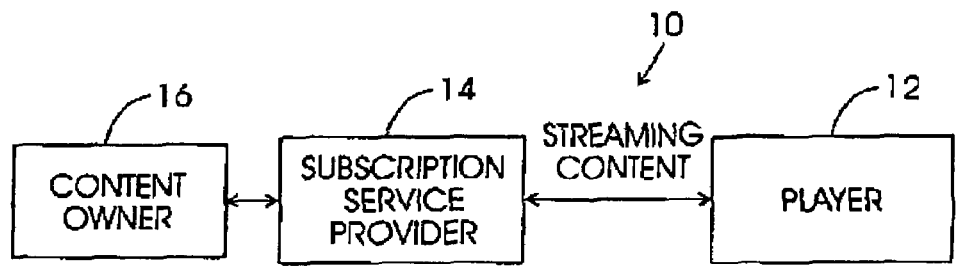
FIG. 1 is a block diagram of the present system.

Referring initially to FIG. 1, a system is shown, generally designated 10, for enforcing content copyright protection as well as subscription service protection. As indicated in FIG. 1, players (only a single player 12 shown for clarity) receive content by multicast streaming from a subscription service provider 14, which in turn receives the content from a content owner 16. While the present invention focusses on streamed data, it is to be understood that the principles of the present invention apply equally to other applications, such as to content that is downloaded in files without streaming.

The components 12, 14, 16 can be implemented by hardware or software. They can communicate via wired or wireless links, and can use computer networks such as the Internet to communicate with each other. Content from the content owner 16 can be provided to the subscription service provider 14 off-line, e.g., by shipping disks storing digital content from the content owner 16 to the provider 14.

By "broadcast" or "multicast" is meant the wide dissemination of a program from a source such as the subscription service provider to many players simultaneously over cable (from a satellite source), or wire, or radiofrequency (including from a satellite source).

It is to be understood that the logic shown and discussed below, which may be executed by a processor as a series of computer-executable instructions, is executed by processors associated with one or more of the components 12, 14, 16. The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled C$^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function acts corresponding to those shown.

Figure 2:
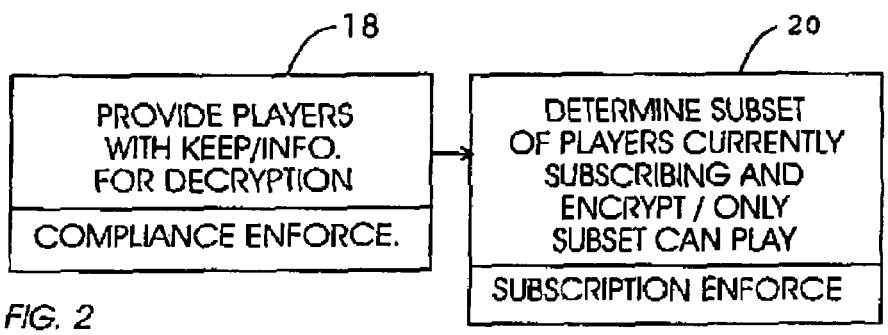
FIG. 2 is a flow chart depicting the dual enforcement domain concept.

Now referring to FIG. 2, the overall logic for enforcing compliance in two domains—copy protection, and subscription—can be seen. Commencing at block 18, all legitimate players are provided with respective keys and/or information that are useful for decrypting streamed content. The initial provision of device keys $K_d$ is made for copy protection compliance. Block 20 represents subscription compliance, wherein the subset of players that have subscribed to a particular channel are identified, and the channel content is encrypted such that only the subset of players subscribing to the channel can decrypt channel content.

Figure 3:
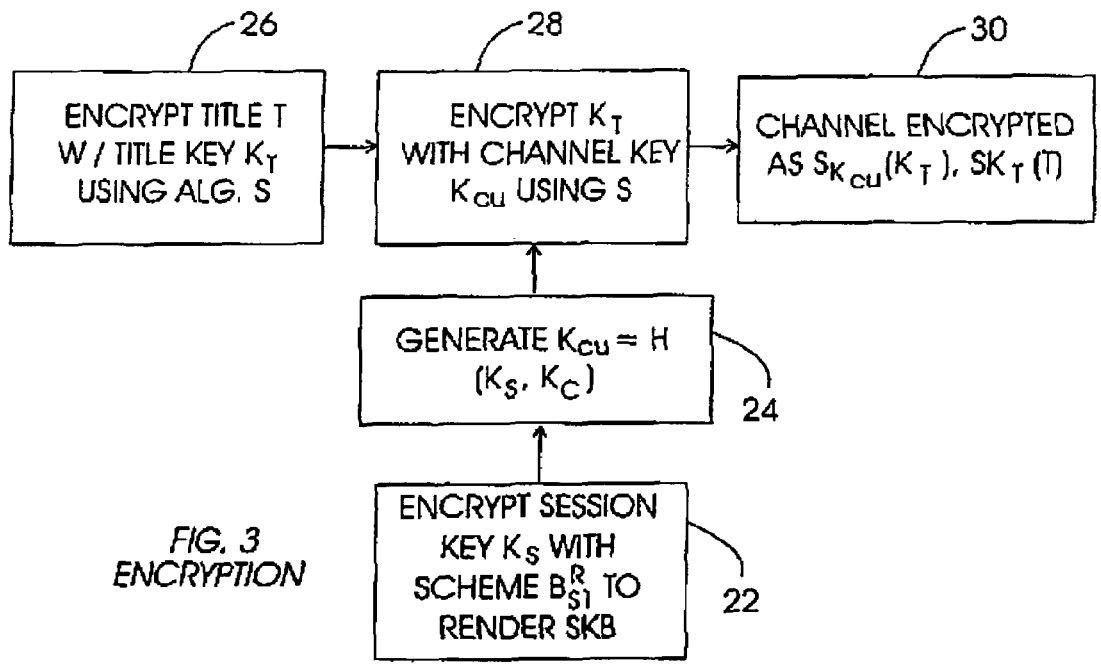
FIG. 3 is a flow chart of the overall encryption logic.

Preferred implementations of the above are set forth below in reference to FIG. 3. In the disclosure below, the notation $B^R_{Sk}$ represents the encryption of a key K using a broadcast encryption algorithm B under a symmetric cryptosystem S, such that players in a set R are excluded. The symmetric cryptosystem S preferably is a symmetric cryptographic algorithm such as DES or SEAL. The resulting ciphertext can be referred to as a session key block.

Commencing at block 22, a session key $K_s$ is encrypted with a copy compliance algorithm $B^R_{S1}$ to render a session key block. In one embodiment, the copy compliance algorithm $B^R_{S1}$ is the method set forth in the above-referenced patent and/or known as the C2 cipher available at www.4centity.com; in another embodiment, it is the method set forth in the parent application, and more particularly it is the subset difference method of the parent application.

Moving to block 24, a channel unique key $K_{cu}$ can be generated from the session key $K_s$ and a channel key $K_c$. In one non-limiting embodiment, the channel unique key $K_{cu}$ is a hash of a concatenation of the session key $K_s$ and channel key $K_c$.

In parallel with the operations of blocks 22 and 24, at block 26 a piece of content to be streamed, e.g., a video clip or movie, audio clip or movie, book, and so on, referred to herein as a "title", is encrypted with a title key $K_T$ using the preferably symmetric algorithm S. At block 28, the results of blocks 24 and 26 are combined as follows. The title key $K_T$ is encrypted with the channel unique key $K_{cu}$ using the preferably symmetric algorithm S. Then, at block 30, the channel is encrypted as the encryption of the title with the title key $(S_{KT}(T))$ and the encryption of the title key with the channel unique key $(S_{Kcu}(K_T))$.

Figure 4:
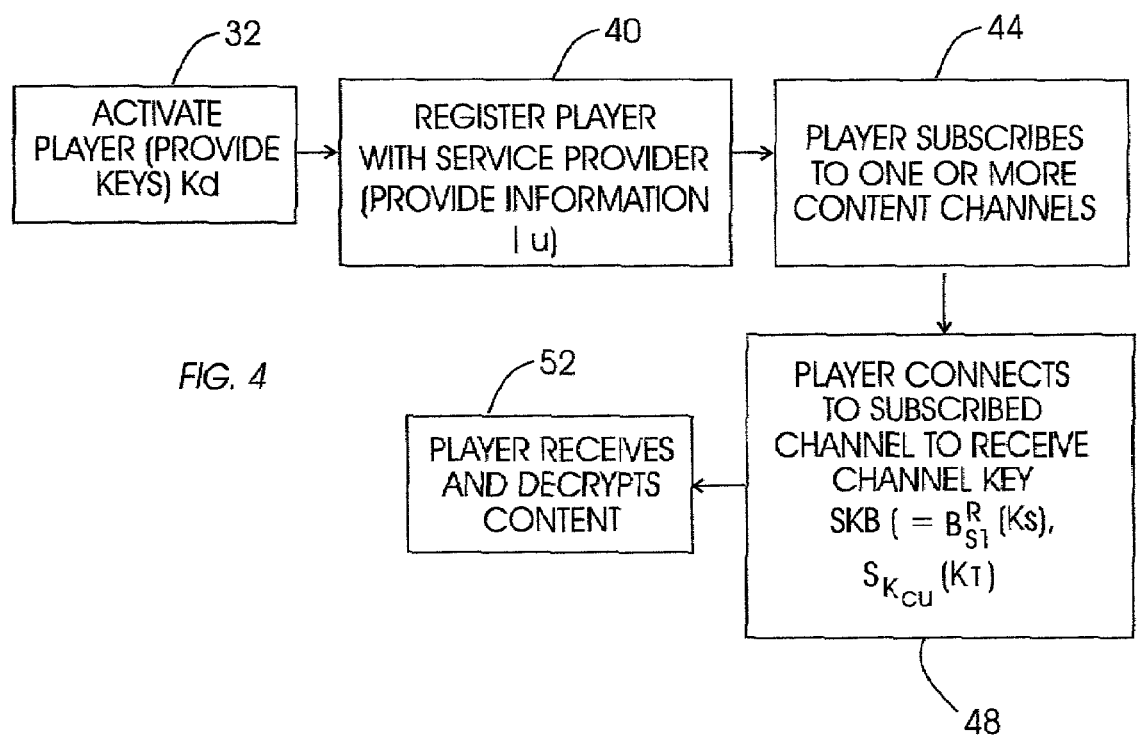
FIG. 4 is a flow chart of the player logic.
Figure 5:
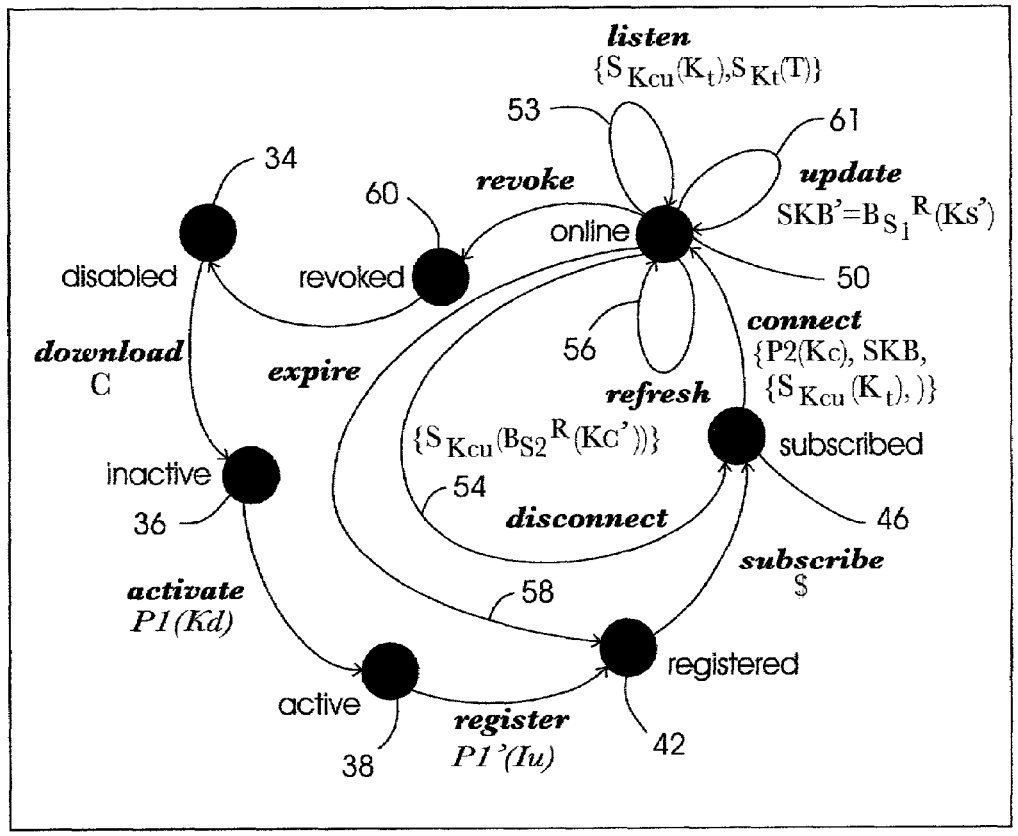
FIG. 5 is a schematic diagram of the various states that a player can enter, along with a legend.

Having described how streamed content preferably is encrypted, FIGS. 4 and 5 show how the system configures players to receive and decrypt content while enforcing both copy protection rules (by ensuring compliant players) and subscription protection. Commencing at block 32 in FIG. 4 and as indicated at state 34 in FIG. 5, an initially disabled player is enabled to an inactive state 36 by providing it with the code necessary to undertake the logic herein, and then activated to state 38 by providing it with a preferably unique set of device keys $K_d$ in accordance with the above-referenced patent documents. This provision can be made during manufacture or subsequently during a separate activation step. If made separately, the device keys $K_d$ can be transferred using, e.g., a public key exchange method P1.

As indicated at block 40 in FIG. 4, the player can next move to a registered state 42 (FIG. 5). In one non-limiting embodiment, this is done by the player sending public information about itself to the subscription service provider 14, which in return sends private information $I_u$ to the player using a key exchange method P1'. In one nonlimiting embodiment algorithms P1 and P1' can be implemented using secure socket layers with server-side certificates. One set of private information $I_u$ preferably is provided for each subscription. In one illustrative embodiment, the private information $I_u$ is the private information mentioned above and disclosed in the parent application.

Once a player is registered, at block 44 it can move to a subscribed state 46, wherein the player is subscribed to one or more channels from the subscription service provider 14. Ordinarily, the subscription process entails a payment from the player to the service provider. The terms of subscriptions can vary in duration, content, cost, etc., with the subscriptions being dynamic and each player potentially having several subscriptions simultaneously.

Although being entitled to a subscription, a player might not be actually receiving the content until it connects to the service at block 48 to enter an online state 50. The service provider 14 verifies that the player's subscription to the channel is valid for access control, and if valid, a current channel key $K_c$ is sent to the player using a point to point exchange by means of a public key exchange method, denoted P2. The algorithm P2 can be implemented using the method of the above-referenced patent with a player-side media key block and secret media identification known only to the player and the service provider. This player-side media key block is not to be confused with the session key block.

Additionally, the player receives from the service provider the session key block, which as described above is an encryption of the current session key under the abovementioned copy compliance algorithm $B^R_{S1}$. Along with the session key block, the player receives the current title key $K_T$, encrypted with the channel unique key $K_{cu}$ as described above.

In an alternative embodiment, instead of a point-to-point transfer the data exchanged at block 48 can be broadcast in-band. Specifically, the encryption data can be periodically transmitted over the channel, so that online, authorized players can receive it and use it for decryption.

In any case, it may now be appreciated that an authorized player, while online, can receive and decrypt content at block 52 if it has not been revoked per the below discussion, and if it has a valid subscription to the channel. To decrypt the content, the player accesses its various device keys $K_d$ and private information $I_u$ as follows. In one illustrative, non-limiting embodiment, the session key $K_s$ is derived from the session key block using the device keys $K_d$ in accordance with the patent and/or parent application referred to above. Using the session key $K_s$ and channel key $K_c$, the channel unique key $K_{cu}$ is decrypted. In turn, the title key $K_T$ is derived using the channel unique key $K_{cu}$, with the title key $K_T$ being used for decrypting content. This process is represented by listen loop 53 in FIG. 5.

The player can return to state 46 in FIG. 5 by disconnecting, as indicated by the loop 54. Also, as discussed above the channel key $K_c$ can be periodically refreshed, as indicated by the loop 56, by sending a new channel key $K_c'$ only to subscribers of the channel. The new key preferably is sent using a message that is a function of the old channel key $K_c$ and a subscription compliance algorithm $B^R_{S2}$, namely, $S_{Kcu}(B^R_{S2}(K_c'))$. In one preferred, non-limiting embodiment, the subscription compliance algorithm $B^R_{S2}$ is the above-summarized subset difference method of the parent application, with players whose subscriptions have expired in the preceding period being included in the revoked set R of the algorithm. Such a refresh can be thought of as a minimal refresh, since it excludes only players whose subscriptions have just expired. Note that players not having the current channel key $K_c$ cannot decrypt the refresh message and therefore need not be included in the set R, thus reducing the size of the refresh message.

For the first time a player connects, to obtain the channel unique key $K_{cu}$ the player uses its device keys $K_d$ to obtain the session key $K_s$, which is then combined with the channel key $K_c$ using the hash function to render the channel unique key $K_{cu}$. After a refresh loop 56, a new channel key $K_c'$ is computed (using private information $I_u$ in accordance with the parent application, and more preferably with the subset difference method of the parent application) and combined with the session key, with the resulting new channel unique key $K_{cu}'$ excluding all revoked and expired players.

When the player's subscription expires, the player is not provided with the refreshed channel key, causing it to return to the registered state 42 in FIG. 5, as indicated by the loop 58. Subsequently moving from state 42 to state 46 and from state 46 to state 50 is accomplished in accordance with the disclosure above.

Players that are not connected during a refresh but still have a valid subscription can connect to obtain the current channel key. However, as recognized herein a rogue player can claim to have disconnected but in fact can continue to listen to the channel. To counter this, the service provider 14 maintains a list of all players that could have the current channel key, and these players can be excluded from the refresh (i.e., entered into the set R) if their subscriptions have expired. Players with a subscription that is just expiring and that obtained the channel key through a connect transition at some point in the past are considered to be connected for the purpose of exclusion in the current refresh transition.

Additionally, if a player whose subscription expired more than one refresh period in the past (and, hence, is not included in the exclude set R) obtains the channel key $K_c$ illegally, it would be able to decrypt the new channel key $K_c'$ and all future channel keys, as long it constantly monitors the channel. Accordingly, the present invention can exclude, in every refresh message, all players whose subscription will not be valid during the following period. Such a refresh can be thought of as a full refresh requiring a full revocation message. However, since the size of the exclude set R might be large, the following two optimizations can be used.

The full revocation message can be split and gradually sent over time. As a result, the refresh does not take effect instantaneously for all players. Also, players whose subscription expired long ago are sporadically revoked. That is, an intermediate revocation message is constructed that includes all players who must be revoked as well as many of the long-ago expirations that bandwidth permits.

In the event that it is discovered that the player has been compromised, it is necessary to revoke the player's device keys $K_d$ and configure it to a revoked state 60, so that it cannot be used to make unauthorized copies of content. The copy compliance algorithm $B^R_{S1}$ must be able to trace the originally licensed players whose device keys were compromised and revoke these players.

To revoke one or more players, a new session key block is generated that revokes all players that have ever been revoked, i.e., exclusion is cumulative. The content owner 16 can distribute the new session key blocks to the service provider 14, which is responsible for updating it for secure streaming. The new session key block is broadcast in the clear to all connected players to update the session key block, as indicated by the loop 61; those who connect after the update can obtain the new session key block in a point-to-point exchange. Note that typically the same session key block is used by all compliant service providers for all channels.

When a revoked, connected player attempts to listen to any channel for which an updated session key block has been provided, it cannot decrypt the new session key $K_s'$ and thus cannot access the content. When this happens, the user of the revoked player must restart the entire process, since a revoked player is for all practical purposes the same as a disabled player in state 34.

As mentioned above, the preferred implementation requires a player to store a set of device keys for content protection and a set of private information for each subscription service. As recognized here, this might exceed the capacity of smaller players, requiring that only a single enforcement domain be used, either copy protection or subscription protection.

For a copy protection domain only, keys are drawn from a tree and provided only once. The channel key is transmitted to all players and can be decrypted by all; however, a compliant player will not use the key to decrypt content unless it is subscribed. The refresh transition simply refreshes the channel key using the previous channel key. This method requires only a single set of keys at a player, requires a central agency to coordinate revocations, and should be designed to sustain many revocations.

For subscription domain only, all keys are drawn from a single tree, and there are no device keys. The unique set of keys is given to players at activation. During subscription the player and its keys are identified and a message containing the channel key is transmitted. At refresh, a revocation message excluding all players whose subscriptions is about to expire is multicast.

Because every service provider must be able to construct a revocation message, all providers must have the same keys. Therefore, this scheme uses public key techniques. Players that are found to violate compliance can be excluded from every message, thus effectively revoking those players.

It is to be understood that the principles disclosed herein can be applied to multicasting such as videoconferencing, with the service provider enforcing access control to the conference. Every node encrypts its messages using the same algorithms described in the listen state. A title can be equivalent to a message originating from one user, or the conference may be split into chunks of fixed duration. Compliance is used to ensure no unauthorized use of the conference content is made.

While the particular METHOD FOR ENSURING CONTENT PROTECTION AND SUBSCRIPTION COMPLIANCE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A computer-implemented method for securely transmitting multicast data, comprising:
encrypting at least one title T with at least title key $K_T$; and
encrypting the title key $K_T$ with at least one channel-unique key $K_{cu}$ using at least one encryption function S to render a multicast data channel encrypted as $S_{Kcu}(K_T)$, $S_{KT}(T)$, wherein the channel-unique key $K_{cu}$ is the result of a combination of a channel key $K_c$ and a session key $K_s$, wherein the session key $K_s$ is encrypted with at least a first encryption scheme $B^R_{s1}$ to render a session key block, further comprising providing at least one player with device keys $K_d$ to activate the player and providing the player with the channel key $K_c$ and the session key block, wherein the player can determine the session key $K_s$ from the session key block using the device keys $K_d$ further comprising periodically refreshing the channel key $K_c$ to enforce subscriptions, wherein a new channel key $K_c'$ is encrypted with at least a second encryption scheme $B^R_{s2}$ and wherein the encryption scheme $B^R_{s2}$ includes:
assigning each player in a group of players respective private information $I_u$;
partitioning players not in a revoked set R into disjoint subsets $S_{i1}, \ldots S_{im}$ having associated subset keys $L_{i1}, \ldots L_{im}$; and
encrypting the session key $K_s$ with the subset keys $L_{i1}, \ldots L_{im}$ to render m encrypted versions of the session key $K_s$.

2. The method of claim 1, wherein the combination is a hash function of a concatenation of the channel key $K_c$ and session key $K_s$.

3. The method of claim 1, wherein at least one of the providing acts is undertaken in a point-to-point communication.

4. The method of claim 1, wherein at least one of the providing acts is undertaken as part of a broadcast.

5. The method of claim 1, comprising selectively updating the session key block.

6. The method of claim 5, comprising updating the session key block by encrypting an updated session key with at least the encryption scheme $B^R_{s1}$.

7. The method of claim 1, wherein the new channel key $K_c'$ is sent in a message that is split.

8. The method of claim 1, wherein the new channel key $K_c'$ is refreshed using plural messages.

9. The method of claim 1, wherein the encryption scheme $B^R_{s2}$ further includes partitioning the players into groups $S_1, \ldots, S_w$, wherein "w" is an integer, and the groups establish subtrees in a tree.

10. The method of claim 9, wherein the tree includes a root and plural nodes, each node having at least one associated label, and wherein each subset includes all leaves in a subtree rooted at some node $v_i$ that are not in the subtree rooted at some other node $v_j$ that descends from $v_i$.

11. The method of claim 10, wherein the revoked set R defines a spanning tree, and wherein the method includes:
initializing a cover tree T as the spanning tree;
iteratively removing nodes from the cover tree T and adding nodes to a cover until the cover tree T has at most one node.

12. The method of claim 10, wherein each node has at least one label possibly induced by at least one of its ancestors, and wherein each player is assigned labels from all nodes hanging from a direct path between the player and the root but not from nodes in the direct path.

13. The method of claim 12, wherein labels are assigned to subsets using a pseudorandom sequence generator, and the act of decrypting includes evaluating the pseudorandom sequence generator.

* * * * *